US008696798B2

(12) United States Patent
Mak

(10) Patent No.: US 8,696,798 B2
(45) Date of Patent: Apr. 15, 2014

(54) CONFIGURATIONS AND METHODS OF HIGH PRESSURE ACID GAS REMOVAL

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 209 days.

(21) Appl. No.: 13/119,870

(22) PCT Filed: Sep. 30, 2009

(86) PCT No.: PCT/US2009/058955
§ 371 (c)(1),
(2), (4) Date: Apr. 22, 2011

(87) PCT Pub. No.: WO2010/039785
PCT Pub. Date: Apr. 8, 2010

(65) Prior Publication Data
US 2011/0203314 A1    Aug. 25, 2011

Related U.S. Application Data

(60) Provisional application No. 61/102,053, filed on Oct. 2, 2008.

(51) Int. Cl.
*B01D 53/14* (2006.01)
(52) U.S. Cl.
USPC .......... 95/172; 95/173; 95/174; 95/177; 95/192; 95/208; 95/227; 95/236; 96/234

(58) Field of Classification Search
USPC .............. 95/183, 172, 173, 192, 208, 227; 62/617
See application file for complete search history.

(56) References Cited

U.S. PATENT DOCUMENTS

| 3,594,985 | A | 7/1971 | Ameen et al. |
| 3,664,091 | A | 5/1972 | Hegwer |
| 4,568,364 | A * | 2/1986 | Galstaun et al. ............... 95/176 |
| 5,061,465 | A | 10/1991 | Carter |
| 7,192,468 | B2 | 3/2007 | Mak et al. |
| 2005/0000360 | A1 | 1/2005 | Mak et al. |
| 2005/0172807 | A1 | 8/2005 | Mak |
| 2006/0196357 | A1 | 9/2006 | Menzel |

FOREIGN PATENT DOCUMENTS

| WO | 2004/052511 | 6/2004 |
| WO | 2007/077137 | 7/2007 |
| WO | 2008/103467 | 8/2008 |
| WO | WO 2008103467 A1 * | 8/2008 | .............. B01D 53/14 |

* cited by examiner

*Primary Examiner* — Duane Smith
*Assistant Examiner* — Joubert X Glover
(74) *Attorney, Agent, or Firm* — Fish & Tsang, LLP

(57) ABSTRACT

Acid gas is removed from a feed gas using a physical solvent that is regenerated using successive flashing stages after heating of the rich solvent using low-level waste heat that is preferably produced or available within the acid gas removal plant. Especially preferred waste heat sources include compressor discharges of the refrigeration system and/or recompression system for CO2, and/or (low level) heat content from the feed gas.

20 Claims, 2 Drawing Sheets

CONFIGURATIONS AND METHODS OF HIGH PRESSURE ACID GAS REMOVAL

This application claims priority to our copending U.S. provisional patent application with the Ser. No. 61/102,053, which was filed Oct. 2, 2008.

FIELD OF THE INVENTION

The field of the invention is acid gas removal from hydrocarbonaceous feed gases, and particularly acid gas removal from natural and synthetic high pressure gases having high CO2 content and concurrent production of CO2 for re-injection.

BACKGROUND OF THE INVENTION

As low sulfur natural gas fields are being depleted, gas production from other sources is necessary to meet today's energy demands. With increasing energy costs, gas production from high acid gas natural gas fields and syngas production via gasification of carbonaceous materials are becoming economically attractive. High acid gas fields and coal mines are still plentiful in many parts of the world. However, due to the relatively high carbon contents of these resources, CO2 emissions from gas processing plants using these resources are often unacceptably high and generally require CO2 capture and sequestration.

Most typically, the CO2 content in high acid gas fields ranges from about 10 mol % to about 50 mol %, which is entirely unsuitable to meet pipeline specifications (e.g., 1 to 2 mol % CO2 and 4 ppmv H2S). Similarly, syngas or hydrogen production from gasification has often unacceptably high acid gas content, which necessitates removal and sequestration of CO2 to minimize greenhouse gas effects. Unfortunately, sequestration of CO2 requires compression to a very high pressure (e.g., 2000 psig or higher), which is energy intensive, especially where CO2 is produced at or near atmospheric pressure from conventional gas treating processes. Typical examples for such CO2 generation and sequestration are provided in U.S. Pat. No. 7,192,468 and WO 2004/052511, which are incorporated by reference herein. While such plants and methods are relatively effective in CO2 removal from high-pressure feed gases, the produced CO2 is at or near atmospheric pressure and so requires substantial expenditure of energy for injection into the formation. Similarly, certain configurations for heating and flashing the heated solvent to about atmospheric pressure to recover CO2 is known from U.S. Pat. Nos. 3,664,091 and 3,594,985, but once again produce a low-pressure CO2 product that requires substantial recompression. Thus, and viewed from a different perspective, all or almost all of the known configurations and methods for acid gas removal produce a treated gas at high pressure and a CO2 stream at close to atmospheric pressure.

In similar configurations and methods, as for example described in WO 2007/077137, a sequential flash process for a heated physical solvent is used where the solvent is flashed to a relatively low pressure (less than 200 psi), and where the solvent is heated using steam. While such configurations reduce the energy demand for CO2 recompression at least to some degree, a relatively large demand for energy is required for the generation of steam used in the solvent heating. Such high energy demand is equally known for processes where sequential flashing of an amine solvent at high temperatures is performed as described in U.S. Pat. No. 5,061,465.

Thus, although various configurations and methods are known to remove acid gases from different feed gases, all or almost all of them suffer from one or more disadvantages. For example, all or almost all of the known processes tend to require significant heating in solvent regeneration, and the recovered CO2 typically requires significant compression as the CO2 is at or near atmospheric pressure. Therefore, there is still a need to provide improved methods and configurations for acid gas removal.

SUMMARY OF THE INVENTION

The present invention is directed to various plant configurations and methods of acid gas removal from a feed gas using a physical solvent where the solvent is regenerated using successive flashing stages and low-level waste heat from various, and most typically at least one or two distinct sources. Especially preferred waste heat sources include compressor discharges of the refrigeration system and/or CO2 compression system, or (low level) heat content from the feed gas. Moreover, the methods and plants according to the inventive subject matter employ pressure letdown of the rich solvent by hydraulic turbines to further recover energy. Therefore, devices with high energy demand such as steam regenerators or stripping vessels can be avoided, and demand for external cooling and/or heating can be significantly reduced.

For example, in one preferred aspect of the inventive subject matter, a method of regenerating a CO2-rich physical solvent that is formed by absorption of CO2 from a gas having a CO2 content of at least 10 mol % and a pressure of at least 1000 psig will include a step of heating the CO2-rich solvent using heat from flash-regenerated lean solvent and heat recovered from the feed gas and/or a compressor discharge (e.g., refrigerant compressor or CO2 recompressor).

Most preferably, the heated CO2-rich solvent has a temperature that is sufficient to allow flashing of between 20% to 40% of CO2 in the CO2-rich solvent at a pressure between 300 and 500 psig and/or flashing of between 20% to 40% of CO2 in the CO2-rich solvent at a pressure between 50 and 300 psig. Viewed from a different perspective, the heated CO2-rich solvent will have a temperature that is sufficient to limit flashing of CO2 from the CO2-rich solvent at a pressure at or near atmospheric pressure to between 5% to 20% of CO2 in the CO2-rich solvent. Thus, it should be appreciated that at least 80% of CO2 can removed from the CO2-rich solvent by heating the CO2-rich solvent to a temperature of between 100° F. to 300° F. using waste heat, wherein the heated CO2-rich solvent is preferably flashed to produce at least two separate CO2 streams at a pressure of between 50 psig to 500 psig. In these and other contemplated methods and plants, it is preferred that the flash-regenerated lean solvent has a temperature of at least 60° F., and more typically at least 100° F.

It is further generally preferred that the flash-regenerated lean solvent is produced by flashing the CO2-rich solvent across at least two (and more typically three or four) expansion devices, some of which are preferably expansion turbines. To achieve particularly low acid gas concentrations in the lean solvent, it is preferred that the flash-regenerated lean solvent is produced by flashing the CO2-rich solvent to a pressure below atmospheric pressure.

In another exemplary aspect of the inventive subject matter, a method of removing CO2 from a feed gas includes a step of absorbing CO2 in an absorber from the feed gas using a lean physical solvent to produce a treated gas depleted in CO2 and a CO2-rich solvent, and another step of heating the CO2-rich solvent in a plurality of heat exchangers using waste heat that is produced in the process of removing CO2 from the feed gas. Contemplated methods will further include a step of separating a first CO2-rich stream from the heated CO2-rich solvent at a pressure of at least 300 psig, and separating a second CO2-rich stream from the heated CO2-rich solvent at a pressure of at least 100 psig to so form a flashed solvent, wherein first and second CO2-rich streams comprise at least 70% of total CO2 of the CO2-rich solvent. In yet another step, the flashed solvent is cooled using refrigeration generated by partial expansion of the CO2-rich solvent. Most typically, first and second CO2-rich streams comprise at least 90% CO2.

In such methods, it is generally preferred that the waste heat is produced by at least one of the flashed solvent, the feed gas, and a compressor discharge, and/or that the CO2 is present in the feed gas at a concentration of at least 10 mol %, wherein the CO2 is absorbed in the absorber at a pressure of at least 1000 psi. While numerous gases may be used as feed gas, it is typically preferred that the feed gas is syngas or a natural gas from a high-CO2 reservoir producing a feed gas stream having a CO2 content of at least 10 mol %, more typically at least 15 mol %, and most typically at least 25 mol %.

Consequently, the inventor also contemplates an acid gas removal plant that includes or is fluidly coupled to a source of a feed gas that is configured to provide a feed gas having a pressure of at least 1000 psi and a CO2 content of at least 10 mol %. In most typical plants, an absorber is fluidly coupled to the source of the feed gas and CO2 is absorbed from the feed gas using a lean physical solvent to thereby produce a CO2 depleted gas stream and a CO2-rich solvent. Most typically, several heat exchangers are arranged to heat the CO2-rich solvent using waste heat to thereby form a heated CO2-rich solvent, and several pressure reduction devices and flash vessels are arranged such as to allow sequential flashing of the heated CO2-rich solvent such that (a) a first CO2-rich stream is formed from heated the CO2-rich solvent at a pressure of at least 300 psig, and such that (b) a second CO2-rich stream is formed from the heated CO2-rich solvent at a pressure of at least 100 psig. It is still further particularly preferred that in such plants first and second CO2-rich streams comprise at least 70% of total CO2 of the CO2-rich solvent.

In particularly preferred plants, the heat exchangers are thermally coupled to at least one of a CO2-rich feed gas, the lean solvent, and a compressor discharge stream (to so allow heating of the CO2-rich solvent to a temperature of at least 200° F.), and the source is a natural gas well or a syngas production plant. Where the CO2 is to be (re)injected into a formation, it is generally preferred that a compressor (e.g., feed gas, recycle gas, or refrigeration compressor) is included. Moreover, it is generally preferred that an expansion turbine is fluidly coupled to the absorber upstream of the heat exchangers to recover energy and/or produce cooling.

Various objects, features, aspects and advantages of the present invention will become more apparent from the following detailed description of preferred embodiments of the invention.

DETAILED DESCRIPTION

The inventor has discovered that acid gases can be removed from a feed gas that has relatively high pressure and CO2 content by absorbing the CO2 in a physical solvent to form a rich solvent, where the rich solvent is then heated and flashed to reduced pressure in several stages to so produce high-pressure CO2 product streams and a lean solvent. The lean solvent may be further flashed to a pressure below atmospheric pressure to so generate an ultra-lean solvent.

More specifically, it is preferred that contemplated methods of regenerating a CO2-rich physical solvent include those in which the rich solvent is heated and depressurized in multiple steps to atmospheric or sub-atmospheric pressure, wherein heating is performed at a temperature effective to allow removal of more than 50% of the CO2 from the solvent at a pressure above 100 psig to generate a CO2 product that need significantly less compression where the CO2 product is injected back into the formation or otherwise sequestered. Thus, in further preferred methods, the CO2-rich physical solvent is heated in several heat exchangers using low-grade heat and is partially depressurized to a pressure above atmospheric pressure (which will typically yield a hydrocarbonaceous recycle stream). A first CO2 rich stream is then separated from the partially depressurized heated rich solvent at a pressure of at least 100 psig, and the partially depressurized heated rich solvent is still further depressurized to thereby regenerate the lean physical solvent and to generate at least a second CO2 rich stream.

Therefore, the inventor particularly contemplates a method of regenerating a CO2-rich physical solvent (which is typically formed by absorption of CO2 from a gas having a high CO2 content of at least 10 mol % and a pressure of at least 1000 psig) in which the CO2-rich solvent is heated using heat from flash-regenerated lean solvent and heat recovered from the feed gas and/or compressor discharge (e.g., refrigeration compressor discharge, recompressor discharge, etc.). Thus, especially contemplated methods include those in which CO2 is absorbed in an absorber using a lean physical solvent to produce a treated gas depleted in CO2 and a CO2-rich solvent. The CO2-rich solvent is then heated in a plurality of heat exchangers using waste heat that is most preferably produced in the process of removing CO2 from the feed gas, and first and second CO2-rich streams are separated from the heated CO2-rich solvent at a pressure of at least 300 psig and at least 100 psig, respectively, wherein first and second CO2-rich streams comprise at least 70% of total CO2 of the CO2-rich solvent. The flashed solvent is then cooled using refrigeration generated by partial expansion of the CO2-rich solvent.

Figure 1:
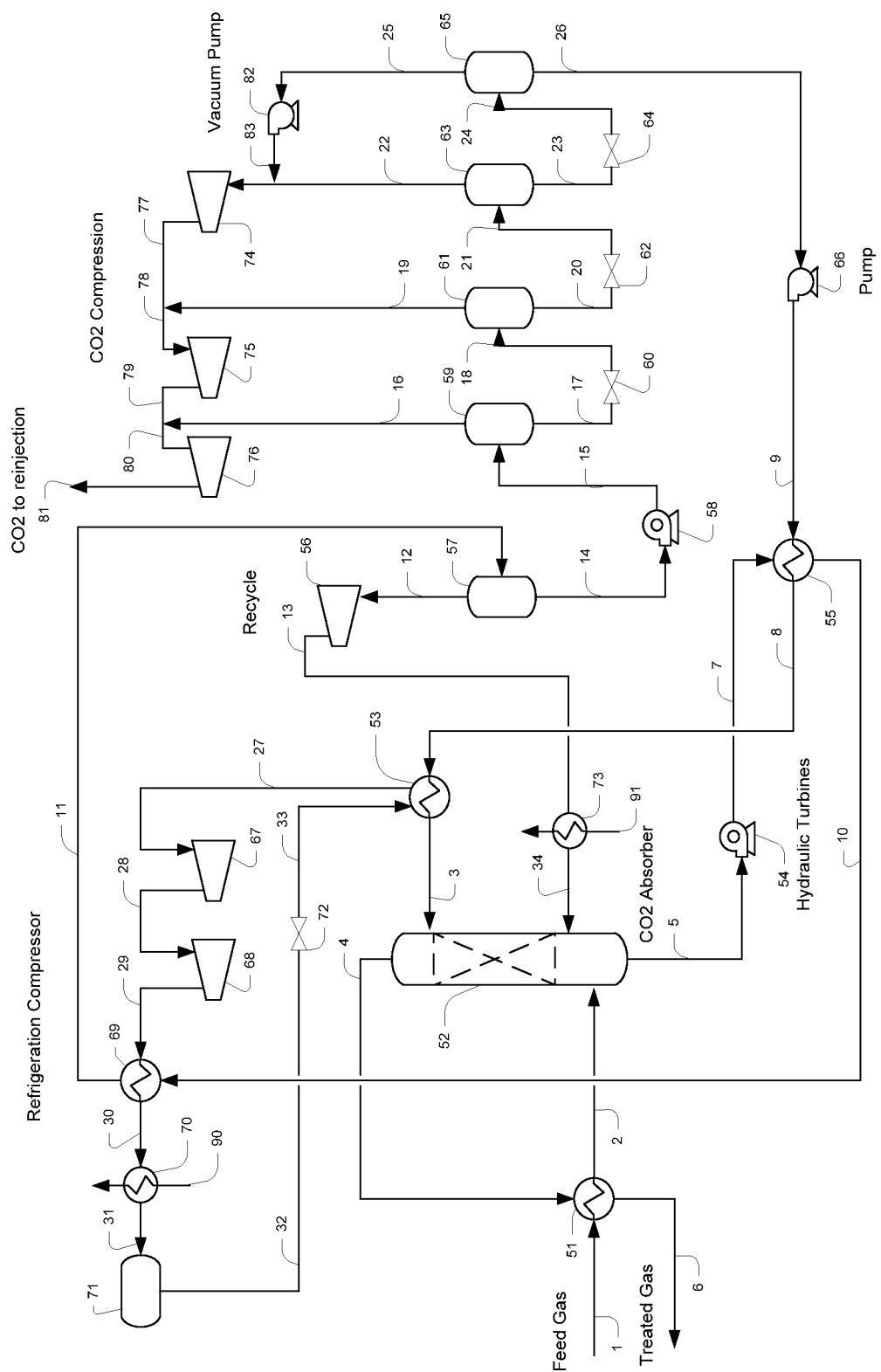
FIG. 1 is an exemplary schematic for acid gas removal from natural gas according to the inventive subject matter.

For example, one preferred plant configuration (e.g., for acid gas removal from natural gas) according to the inventive subject matter is depicted in FIG. 1 in which feed gas stream 1, with a typical composition of 14 mol % CO2, 84 mol % C1, 2 mol % C2, 0.1 mol % C3, and 30 ppmv H2S, at about 100° F. and about 1000 psig is cooled to about 5° F. using refrigerant content of the absorber overhead stream 4 in exchanger 51. The term "about" where used herein in conjunction with a numeral refers to a +/−10% range (inclusive) of that numeral. The absorber overhead stream 6 leaves the plant as treated gas (typically to a pipeline). The chilled feed gas stream 2 is counter-currently scrubbed by lean solvent stream 3 in absorber 52 forming a rich CO2 laden solvent stream 5. Most typically, the absorber contains contacting devices, including packings or trays, or other suitable media for CO2 absorption.

The rich solvent stream 5, at about 10° F., is then letdown in pressure via the first hydraulic turbine 54 to about 500 psig. The letdown stream 7 is heated in exchanger 55 by the lean solvent stream 9 to about 100° F. forming stream 10 which is further heated in heat exchanger 69 by the refrigeration compressor discharge stream 29 forming the stream 11 at about 200° F. prior to flashing to separator 57. The flash separator produces the flashed vapor stream 12 and flashed liquid stream 14. The vapor stream 12 is compressed by compressor 56 to about 1000 psig forming stream 13 which is cooled by cooling water stream 91 in exchanger 73 forming stream 34 that is recycled back to the absorber. The flashed liquid stream 14 is letdown in the second hydraulic turbine 58 to about 300 psig forming stream 15.

It should be recognized that in such configurations the hydraulic turbine operates as an energy efficient device as it generates refrigeration cooling by expansion and flashing of the acid gas content while providing work (e.g., drive the solvent circulation pump or generate electric power). The rich solvent 15 is flashed to separator 59 operating at about 300 psig producing flashed vapor stream 16 and a flashed liquid stream 17. It should be appreciated despite the high operating pressure of 300 psig, about 40% of the CO2 from the feed gas is produced from separator 59. Stream 16 is combined with the CO2 compressor inter-stage stream 79, forming stream 80 which is further compressed by the CO2 compressor 76 to about 2000 psig forming stream 81 for CO2 re-injection. The flashed solvent stream 17 is letdown via JT valve 60 forming stream 18 to a third separator 61 operating at about 70 to 150 psig. The flashed vapor stream 19 is combined with the CO2 compressor discharge stream 77 forming stream 78 prior to being compressed by CO2 compressor 75.

The flashed solvent stream 20 is letdown via JT valve 62 forming stream 21 to a fourth separator 63 operating at about atmospheric pressure. The flashed vapor stream 22 is combined with the CO2 stream 83 from the vacuum pump 82 prior to being compressed by CO2 compressor 74 to about 70 to 150 psig, forming stream 77. The atmospheric flashed solvent stream 23 is letdown via JT valve 64 forming stream 24 to the fifth stage flash drum 65 operating at a vacuum pressure of 2 psia to 13 psia, which produces a flashed vapor stream 25 and a flashed liquid stream 26. The flashed vapor is compressed by vacuum pump 82 to atmospheric pressure forming stream 83 which is combined with the atmospheric flash prior to being further compressed by the CO2 compression system. The almost fully regenerated lean solvent stream 26 is pumped by pump 66 to about 1000 psig forming stream 9 which is heat exchanged with stream 7 in exchanger 55 to 20° F. forming stream 8, which is further cooled by propane in the propane chiller 53 to 0 to −40° F., forming the chilled solvent stream 3 prior to returning to the absorber.

Low pressure propane refrigeration vapor stream 27 is compressed by at least two stage refrigeration compressors 67 and 68 via stream 28. The compressor discharge stream 29, typically at about 150 to 300° F., is used to provide heating to the rich solvent stream 10 in exchanger 69. The cooled propane stream 30 is cooled by cooling water stream 90 (or air cooler) in exchanger 70, forming the liquid propane stream 31. The propane refrigerant is stored in surge drum 71 at about 100° F., which is then via stream 32 letdown in JT valve 72 to about 0 to 10 psig forming refrigerant stream 33 supplying the cooling requirement in exchanger 53.

Figure 2:
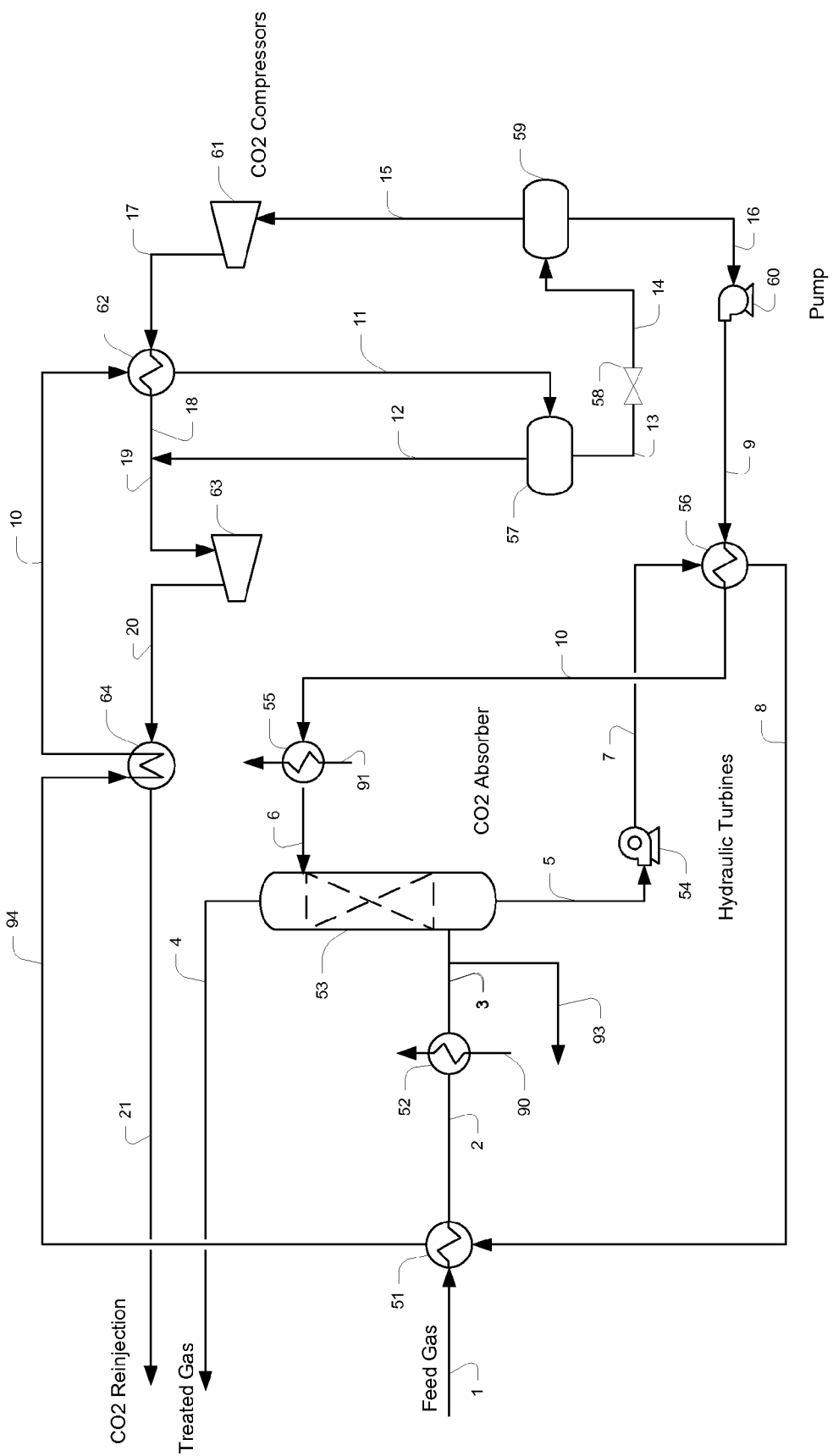
FIG. 2 is an exemplary schematic for acid gas removal from syngas according to the inventive subject matter.

Another exemplary plant configuration (e.g., where acid gas is removed from syngas) according to the inventive subject matter is depicted in FIG. 2 which processes feed gas stream 1, with a typical composition of 40 mol % CO2, 56 mol % H2, 5 mol % CO, and 10 ppmv H2S, and saturated with water. Stream 1 is typically at a temperature of about 250 to 300° F. and has a pressure of about 1000 psig. The syngas feed gas often contains as much as 40% water vapor that must be removed in most cases by cooling upstream of the acid gas removal unit, which is often achieved with the use of cooling water. However, in preferred processes the cooling requirement is satisfied using the rich solvent, thereby reducing or even eliminating the need for cooling water. The rich solvent stream 8 at about 100° F. is used to cool the syngas to about 150° F. forming cooled gas stream 2. Viewed from another perspective, waste heat from the syngas feed is advantageously utilized to heat the rich solvent for solvent regeneration, to so eliminate any external heating requirement.

If necessary, the feed gas stream 2 is further cooled in exchanger 52 using cooling water stream 90, forming a further cooled gas stream 3 that is fed to the absorber. Water stream 93 is condensed and removed from the system. The cooled feed gas is counter-currently scrubbed by lean solvent stream 6 in absorber 53, producing a CO2 laden solvent stream 5 and a treated gas stream 4 depleted in acid gases. The absorber contains contacting devices including packings or trays or other suitable media for CO2 absorption. The rich solvent stream 5, typically at 10° F., is letdown in pressure via the first hydraulic turbine 54 to about 300 to 500 psig. The resultant two phase stream 7 is heated in exchanger 56 by the lean solvent stream 9 to about 100 to 150° F. forming stream 8 which is further heated in heat exchanger 51 by the heat content from the feed gas to about 200 to 250° F. forming stream 94. Optionally, stream 94 is further heated by the CO2 compressor discharge stream 20 in heat exchanger 64 forming stream 10 which is further heated in exchanger 62 by the CO2 compressor discharge stream 17. The two phase stream 11 is flashed to about 300 to 500 psig in separator 57 producing the flashed vapor stream 12 and flashed liquid stream 13. The vapor stream 12 is compressed by compressor 63 to about 2000 psig forming stream 20 which is further cooled by physical solvent stream 94 for CO2 re-injection. The flashed liquid stream 13 is letdown in pressure to about 100 to 200 psig via JT valve 58 forming stream 14 in a second separator 59 producing flashed vapor 15 and flashed lean solvent 16. Once more, it should be recognized that in such configurations the hydraulic turbine operates an energy efficient device as it generates refrigeration cooling by expansion and flashing of the acid gas content while providing shaft work to provide work (e.g., drive the solvent circulation pump or generate electric power).

The flashed vapor stream 15 is compressed by the CO2 compressor 61 and the heat of compression is recovered by heating the rich solvent stream 10 in exchanger 62 forming stream 18 which is combined with the flashed vapor stream 12 forming stream 19 prior to feeding the CO2 compressor 63 that produces stream 21 for injection. The so regenerated lean solvent stream 16 is pumped by pump 60 to about 1000 psig forming stream 9 which is heat exchanged with stream 7 in exchanger 56 to 20 to 50° F. forming stream 10 that is further cooled by propane stream 91 in the chiller 55 forming the chilled solvent stream 6 prior to returning to the absorber.

It should be appreciated that among other benefits of contemplated configurations and methods, contemplated processes use a physical solvent at close to ambient temperature as a coolant to the compression systems and feed gas stream, reducing consumption of cooling water of the facility. Moreover, it should be appreciated that the residual acid gases in the lean solvent are reduced to a very low level with the application of low level waste heat in conjunction with letdown flash regeneration. For example, in especially preferred aspects of the inventive subject matter, the rich solvent is regenerated using a feed gas cooler, lean/rich solvent exchanger, and heat exchangers using waste heat from the refrigeration compressor and/or CO2 compressor discharge. Over 80% of the CO2 is regenerated by heating the solvent to 100° F. to 300° F. using waste heat, producing high pressure CO2 streams at a pressure of between 50 psig to 500 psig, minimizing CO2 generation at or near atmospheric pressure.

Viewed from another perspective, only 10% to 20% of the CO2 is produced at or near (less than 30 psi) atmospheric pressure, which significantly reduces compression costs. With respect to the high pressure CO2 streams, it is generally contemplated that about 20 to 40% of the CO2 is produced at a pressure of about 300 to 500 psig and about 20 to 40% at a pressure of about 50 to 300 psig (which may be fed to different stages of the CO2 compressor or even different compressors). In still further preferred aspects, contemplated plants will include a recycle gas compressor which recycles at least a portion of flash vapor to the absorber for re-absorption of the valuable product gases, maintaining the product gases losses to less than 5%, most preferably less than 1% and the CO2 stream at 90 mol %, most preferably at 95 mol % or higher concentration.

In particularly preferred aspects, the solvent is flashed to sub-atmospheric pressure to so produce an ultra lean solvent that comprises less than 100 ppm H2S (most typically less than 10 ppm) and less 0.5 mol % CO2 (most typically less than 0.1 mol %), which is needed where the treated gas is fed to a pipeline as current pipeline gas specifications require equal or less than 1 mol % CO2 and equal or less than 4 ppmv H2S. Thus, suitable feed gases will also include H2S in amounts of at least 100 ppm, more typically at least 200 ppm, and most typically at least 500 ppm. Moreover, it should be noted that the feed gas is preferably at least partially dehydrated, and all known dehydrators are deemed suitable for use herein (e.g., glycol contractor, molecular sieves, etc.).

With respect to suitable feed gases it should be appreciated that the pressure of such gases may vary considerably, and that the nature of the gas will at least in part determine the pressure. For example, where the fed gas is natural gas or syngas suitable pressures will generally range between atmospheric pressure and several thousand psig. However, it is particularly preferred that the feed gas has a pressure of at least about 400 psig, more typically at least about 1000 psig, even more typically at least about 1500 psig. Similarly, the nature of the solvent may vary considerably, and all physical solvents and mixtures thereof are deemed appropriate for use herein. There are numerous physical solvents known in the art, and exemplary preferred physical solvents include FLUOR SOLVENT™ (propylene carbonate), NMP (normal-methylpyrolidone), SELEXOL™ (dimethyl ether of polyethylene glycol), and TBP (tributyl phosphate), and/or various polyethylene glycol dialkyl ethers. Alternatively, other solvents including enhanced tertiary amine (e.g., piperazine) or other solvent or a mixture of solvents may be employed having similar behavior as physical solvent.

Flashing of the rich solvent may be performed using numerous devices, and it is generally contemplated that all pressure reduction devices are suitable for use herein. However, with respect to the amount of pressure reduction it is typically preferred that the rich solvent (after providing work and/or cooling) is let down in pressure to a pressure sufficient to release at least 70% (more typically at least 90%, and most typically at least 95%) of the dissolved CO2. The so produced carbon dioxide is then separated in one or more separators (typically including one separator operating at atmospheric and sub-atmospheric pressure) from the lean solvent. It should be especially appreciated that the so generated CO2 stream has CO2 content of over 90%, and more typically of at least 95%. Thus, the so formed carbon dioxide stream is especially suited for enhanced oil recovery.

Therefore, the inventor also contemplates an acid gas removal plant that comprises or is coupled to a source of a feed gas (wherein the feed gas preferably has a pressure of at least 1000 psi and a CO2 content of at least 10 mol %). An absorber is fluidly coupled to the source and allows for absorption of CO2 from the feed gas using a lean physical solvent to thereby produce a lean gas stream and a CO2-rich solvent, and several heat exchangers configured to heat the CO2-rich solvent using waste heat to thereby form a heated CO2-rich solvent. A plurality of pressure reduction devices and flash vessels are arranged in contemplated plants to allow sequential flashing of the heated CO2-rich solvent such that a first CO2-rich stream is formed from heated the CO2-rich solvent at a pressure of at least 300 psig, and such that a second CO2-rich stream is formed from the heated CO2-rich solvent at a pressure of at least 100 psig, wherein first and second CO2-rich streams comprise at least 70% of total CO2 of the CO2-rich solvent.

Consequently, it should be recognized that configurations according to the inventive subject matter will significantly reduce overall energy consumption and capital cost as compared to conventional CO2 removal processes at high CO2 partial pressure using amine or other physical solvents or membranes. Moreover, contemplated configurations and processes will typically not require an external heat source or refrigeration, and heat sources if required will be supplied by the feed gas or heat of compression either from refrigeration and/or CO2 compression system further reducing energy consumption and impact on the environment. Still further, enhanced oil recovery projects will frequently encounter an increase in carbon dioxide concentration in the feed gas, typically from 10% up to as high as 60%. Contemplated configurations and processes can advantageously accommodate these changes with essentially the same solvent circulation rate.

Yet another advantage of contemplated methods and configurations is their simplicity requiring less supporting offsite and utility systems, such as steam boilers or fuel gas heating. For example, contemplated configurations operating a high CO2 feed gas used the waste refrigeration from the physical solvent for process cooling, minimizing cooling water consumption. The only utility requirement is electric power and additional cooling (if necessary) is with ambient air, greatly reducing environment impacts.

Moreover, it should be appreciated that natural gas plant operation with vacuum regeneration and waste heat application can generate a very low CO2 and H2S content lean solvent. For example, in especially preferred configurations, the lean hydrogen sulfide-containing physical solvent comprises at least 100 ppm hydrogen sulfide, and the vacuum flash produces from the lean hydrogen sulfide-containing physical solvent an ultra-lean solvent comprising less than 100 ppm hydrogen sulfide, and more typically an ultra-lean solvent comprising less than 10 ppm hydrogen sulfide. Further aspects, contemplations, and alternative configurations are discussed in our co-pending U.S. patent applications published as US 2005/0172807 and US2005/0000360 (both use depressurizing the rich solvent for cooling) and is further related to our U.S. Pat. No. 7,192,468, which are incorporated by reference herein.

Thus, specific embodiments and applications for configurations and methods for improved acid gas removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of regenerating a CO2-depleted physical solvent from a CO2-rich physical solvent that is formed in a CO2 absorber by absorption of CO2 from a gas having a CO2 content of at least 10 mol % and a pressure of at least 1000 psig, comprising a step of heating the CO2-rich solvent to a temperature of at least 100° F. using heat from flash-regenerated lean solvent and heat recovered from at least one of a feed gas, and a compressor discharge, wherein the heated CO2-rich solvent is flashed to so form the CO2-depleted physical solvent.

2. The method of claim 1 wherein the heated CO2-rich solvent has a temperature that is sufficient to allow flashing of between 20% to 40% of CO2 in the CO2-rich solvent at a pressure between 300 and 500 psig and flashing of between 20% to 40% of CO2 in the CO2-rich solvent at a pressure between 50 and 300 psig.

3. The method of claim 1 wherein the heated CO2-rich solvent has a temperature that is sufficient to limit flashing of CO2 from the CO2-rich solvent at a pressure at or near atmospheric pressure to between 5% to 20% of CO2 in the CO2-rich solvent.

4. The method of claim 1 wherein the heated CO2-rich solvent has a temperature that is sufficient to allow flashing of between 20% to 40% of CO2 in the CO2-rich solvent at a pressure between 300 and 500 psig.

5. The method of claim 1 wherein at least 80% of CO2 is removed from the CO2-rich solvent by heating the CO2-rich solvent to a temperature of between 100° F. to 300° F. using waste heat, and wherein the heated CO2-rich solvent is flashed to produce at least two separate CO2 streams at a pressure of between 50 psig to 500 psig.

6. The method of claim 1 wherein the flash-regenerated lean solvent has a temperature of at least 60° F.

7. The method of claim 1 wherein the flash-regenerated lean solvent is produced by flashing the CO2-rich solvent across at least two expansion devices.

8. The method of claim 7 wherein the flash-regenerated lean solvent is produced by flashing the CO2-rich solvent to a pressure below atmospheric pressure.

9. The method of claim 1 wherein the compressor discharge is a refrigeration compressor discharge or a CO2 compressor discharge.

10. A method of removing CO2 from a feed gas, comprising:
absorbing in a CO2 absorber CO2 from the feed gas using a lean physical solvent to produce a treated gas depleted in CO2 and a CO2-rich solvent;
heating the CO2-rich solvent to a temperature of at least 100° F. in a plurality of heat exchangers using waste heat that is produced in the process of removing CO2 from the feed gas;
separating a first CO2-rich stream from the heated CO2-rich solvent at a pressure of at least 300 psig, and separating a second CO2-rich stream from the heated CO2-rich solvent at a pressure of at least 100 psig to so form a flashed solvent, wherein first and second CO2-rich streams comprise at least 70% of total CO2 of the CO2-rich solvent; and
cooling the flashed solvent using refrigeration generated by partial expansion of the CO2-rich solvent.

11. The method of claim 10 wherein the waste heat is produced by at least one of the flashed solvent, the feed gas, and a compressor discharge.

12. The method of claim 10 wherein CO2 is present in the feed gas at a concentration of at least 10 mol %, and wherein the CO2 is absorbed in the absorber at a pressure of at least 1000 psi.

13. The method of claim 10 wherein the feed gas is syngas.

14. The method of claim 10 wherein the first and second CO2-rich streams comprise at least 90% CO2.

15. An acid gas removal plant, comprising:
a source of a feed gas that is configured to provide a feed gas having a pressure of at least 1000 psi and a CO2 content of at least 10 mol %;
a CO2 absorber fluidly coupled to the source and configured to allow absorption of CO2 from the feed gas using a lean physical solvent to thereby produce a lean gas stream and a CO2-rich solvent;
a plurality of heat exchangers configured to heat the CO2-rich solvent to a temperature of at least 100° F. using waste heat to thereby form a heated CO2-rich solvent;
a plurality of pressure reduction devices and flash vessels arranged such as to allow sequential flashing of the heated CO2-rich solvent such that a first CO2-rich stream is formed from heated the CO2-rich solvent at a pressure of at least 300 psig, and such that a second CO2-rich stream is formed from the heated CO2-rich solvent at a pressure of at least 100 psig;
wherein first and second CO2-rich streams comprise at least 70% of total CO2 of the CO2-rich solvent.

16. The acid gas removal plant of claim 15 wherein the plurality of heat exchangers are thermally coupled to at least one of a CO2-rich feed gas, the lean solvent, and a compressor discharge stream.

17. The acid gas removal plant of claim 15 wherein the source is a natural gas well or a syngas production plant.

18. The acid gas removal plant of claim 15 further comprising a compressor that is configured to compress the first and second CO2-rich streams to a pressure suitable for injection into a formation.

19. The acid gas removal plant of claim 15 further comprising an expansion turbine that is fluidly coupled to the absorber and upstream of the plurality of heat exchangers.

20. The acid gas removal plant of claim 15 wherein the plurality of heat exchangers allow heating of the CO2-rich solvent to a temperature of at least 200° F.

* * * * *